(12) United States Patent
Gupta et al.

(10) Patent No.: US 7,774,583 B1
(45) Date of Patent: Aug. 10, 2010

(54) PROCESSING BYPASS REGISTER FILE SYSTEM AND METHOD

(76) Inventors: Parag Gupta, 5951 Valley Meadow Ct., San Jose, CA (US) 95135; Alexander Klaiber, 231 Sierra Vista Ave., Mountain View, CA (US) 94043; James Van Zoeren, 1105 Milky Way, Cupertino, CA (US) 95014

( * ) Notice: Subject to any disclaimer, the term of this patent is extended or adjusted under 35 U.S.C. 154(b) by 321 days.

(21) Appl. No.: 11/540,766

(22) Filed: Sep. 29, 2006

(51) Int. Cl.
*G06F 9/345* (2006.01)
(52) U.S. Cl. ...................... 712/218; 712/217
(58) Field of Classification Search .................. 712/217, 712/218
See application file for complete search history.

(56) References Cited

U.S. PATENT DOCUMENTS

| | | | |
|---|---|---|---|
| 5,905,855 A | 5/1999 | Klaiber et al. | |
| 6,000,016 A * | 12/1999 | Curtis et al. | 711/138 |
| 6,016,540 A | 1/2000 | Zaidi et al. | |
| 6,112,019 A * | 8/2000 | Chamdani et al. | 712/214 |
| 6,363,336 B1 | 3/2002 | Banning et al. | |
| 6,594,821 B1 | 7/2003 | Banning et al. | |
| 6,668,287 B1 | 12/2003 | Boyle et al. | |
| 6,725,361 B1 | 4/2004 | Rozas et al. | |
| 6,738,893 B1 | 5/2004 | Rozas | |
| 6,748,589 B1 | 6/2004 | Johnson et al. | |
| 6,826,682 B1 | 11/2004 | Rozas et al. | |
| 6,851,040 B2 | 2/2005 | Anvin et al. | |
| 7,015,718 B2 | 3/2006 | Burky et al. | |
| 7,062,631 B1 | 6/2006 | Klaiber et al. | |
| 7,089,397 B1 | 8/2006 | Anvin et al. | |
| 7,089,404 B1 | 8/2006 | Rozas et al. | |
| 7,096,345 B1 * | 8/2006 | Chen et al. | 712/218 |
| 7,096,460 B1 | 8/2006 | Banning et al. | |
| 7,149,851 B1 | 12/2006 | Rozas et al. | |
| 7,149,872 B2 | 12/2006 | Rozas et al. | |
| 7,225,299 B1 | 5/2007 | Rozas et al. | |
| 7,249,246 B1 | 7/2007 | Banning et al. | |
| 7,310,723 B1 | 12/2007 | Rozas et al. | |
| 7,334,109 B1 | 2/2008 | Anvin et al. | |
| 7,337,307 B1 | 2/2008 | Rozas et al. | |
| 7,337,439 B1 | 2/2008 | Johnson et al. | |
| 7,376,798 B1 | 5/2008 | Rozas | |
| 7,380,096 B1 | 5/2008 | Rozas et al. | |
| 7,380,098 B1 | 5/2008 | Anvin et al. | |
| 7,404,181 B1 | 7/2008 | Banning et al. | |
| 7,478,226 B1 | 1/2009 | Klaiber et al. | |

OTHER PUBLICATIONS

Alexander Klaiber and Guillermo Rozas. Title: A Processing Bypass Directory Tracking System and Method, U.S. Appl. No. 11/540,789, filed Sep. 29, 2006.

* cited by examiner

*Primary Examiner*—William M Treat

(57) ABSTRACT

A processing bypass register file system and method are disclosed. In one embodiment a processing bypass register file includes a rotating head pointer, and a plurality of write ports, storage cells and read ports. The write ports receive processing result information. The head pointer identifies which entries are written by the write ports. The plurality of cells store the processing result information. The read ports forward results to the processing data path, and to an architectural register file for retirement.

19 Claims, 5 Drawing Sheets

500

505
STAGING COMPUTATION RESULT INFORMATION

510
RECEIVING COMPUTATION RESULT INFORMATION

520
WRITING COMPUTATION RESULT INFORMATION TO A BYPASS REGISTER

530
ROTATING HEAD/TAIL POINTERS INTO THE BYPASS REGISTER FILE

540
RETIRING COMPUTATION RESULTS BASED UPON TAIL POINTER

550
FORWARDING COMPUTATION RESULT INFORMATION BASED ON BYPASS TRACKING AND CONTROL SIGNALS

FIG 3

N of storage elements (hereafter referred to as a "bypass register file"). Every cycle, the data from storage element number N may be written (retired) to the architectural register file, data from other storage elements i is copied to storage element (i+1), and a new result (if any) is written into storage element number 1, (e.g., results in the bypass register file are physically shifted through the storage elements). Effectively, each result is therefore copied N times before retiring, which increases power usage.

PROCESSING BYPASS REGISTER FILE SYSTEM AND METHOD

FIELD OF THE INVENTION

This invention relates to the field of processing information. In particular, the present invention relates to processing data paths and corresponding control systems and methods.

BACKGROUND OF THE INVENTION

Pipelined processor data paths often stage (temporarily store) results of information processing for some number N of cycles before "retiring" to an architectural register file.

Traditionally, this "staging" is implemented via a series i= 1 ... N of storage elements (hereafter referred to as a "bypass register file"). Every cycle, the data from storage element number N may be written (retired) to the architectural register file, data from other storage elements i is copied to storage element (i+1), and a new result (if any) is written into storage element number 1, (e.g., results in the bypass register file are physically shifted through the storage elements). Effectively, each result is therefore copied N times before retiring, which increases power usage.

The processor's functional units must be able to read the most recent value of a register from either the architectural register file, or from any of the locations in the bypass register file. This requires selecting among N+1 locations, which requires a large number of wires and wire tracks in the processor's core.

SUMMARY

A processing bypass register file system and method are disclosed. In one embodiment a processing bypass register file includes a rotating head pointer, write ports, storage cells and read ports. The write ports receive processing result information. The plurality of cells store the results. The read ports forward results to the processing data path, and to an architectural register file for retirement.

BRIEF DESCRIPTION OF THE DRAWINGS

FIG. 3 is a flow chart of an exemplary processing bypass method in accordance with one embodiment of the present invention.

DETAILED DESCRIPTION

Figure 1:
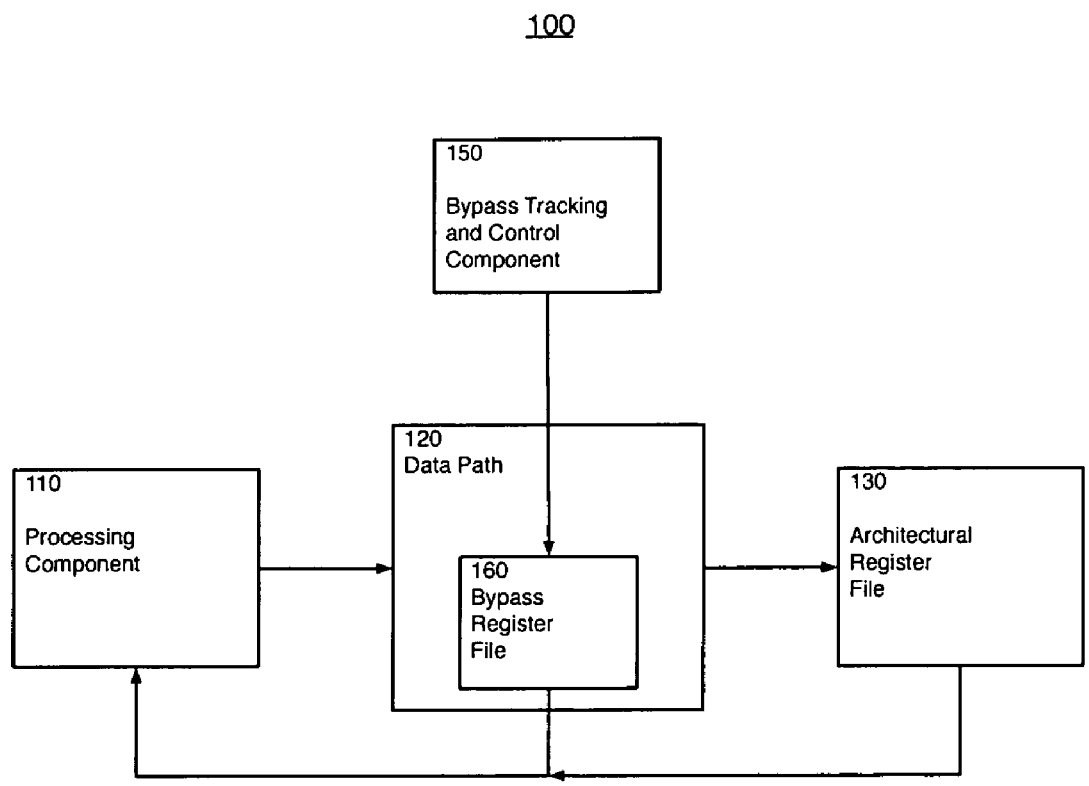
FIG. 1 is a block diagram of an exemplary information processing pipeline in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantifies and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantifies within the computer system memories or registers or other such information storage, transmission or display devices.

The present invention uses a rotating head pointer to indicate where in the bypass register file to write new results (and from where to retire previous results into the architectural register file). In this approach, each result remains in the same location in the bypass register file until it is retired into the architectural register file, thus eliminating the power use from constant copying. Moreover, absent the need for copying, the approach enables the bypass register file to be constructed from RAM (random access memory), which greatly simplifies the wiring problem, since in a RAM array, bit lines (wires) are naturally shared among rows in the array.

FIG. 1 is a block diagram of information processing pipeline 100 in accordance with one embodiment of the present invention. Information processing pipeline 100 includes processing component 110, data path 120, bypass register file 160, bypass tracking and control component 150 and architectural register file 130. Processing component 110 is coupled to data path 120 which in turn is coupled to bypass tracking and control component 150 and architectural register file 130. Processing component 110 processes information and delivers the results to data path 120. Data path 120 stages and delivers processing information to architectural register

130. Bypass tracking and control component 150 tracks and controls the progress of the processing information through data path 120, including selecting data from either the bypass register file 160 or architectural register file 130 to be forwarded to the processing component 110.

In one embodiment, data path 120 includes a bypass register file. Instead of shifting results around inside the bypass register file each cycle, a new result is written into one register (e.g., allocated at the time a computation or other processing instruction issued), where the result remains until the result retires to a architectural register file. In one embodiment, entries/slots in the bypass register file are managed by rotating indices into the bypass register file, one for writing new results, and one for reading a currently retiring value. The number of entries in the bypass register file typically is a function of the depth (number of stages) of the pipeline.

Keeping results in the same location in the bypass register file until retirement saves power, and also enables an embodiment wherein the bypass register file is implemented as a random access memory (RAM) array. This in turn greatly reduces chip area and wiring complexity, as bit lines for reading and writing the bypass register file entries are naturally shared among all entries in the array. In such a RAM embodiment, the number of wires is independent of the number of stages (N) in the pipeline, and the number of bits written in a given cycle is 1/N of the bits written in a traditional design.

It is understood that bypass tracking and control component 150 can be a traditional implementation based on associative lookup. Co-pending application Ser. No. 11/540,789 entitled "A PROCESSING BYPASS DIRECTORY TRACKING SYSTEM AND METHOD" presents an exemplary implementation of bypass tracking and control that does not require associative lookup, and that is particularly well suited to controlling the bypass register file of the present invention.

Figure 2:
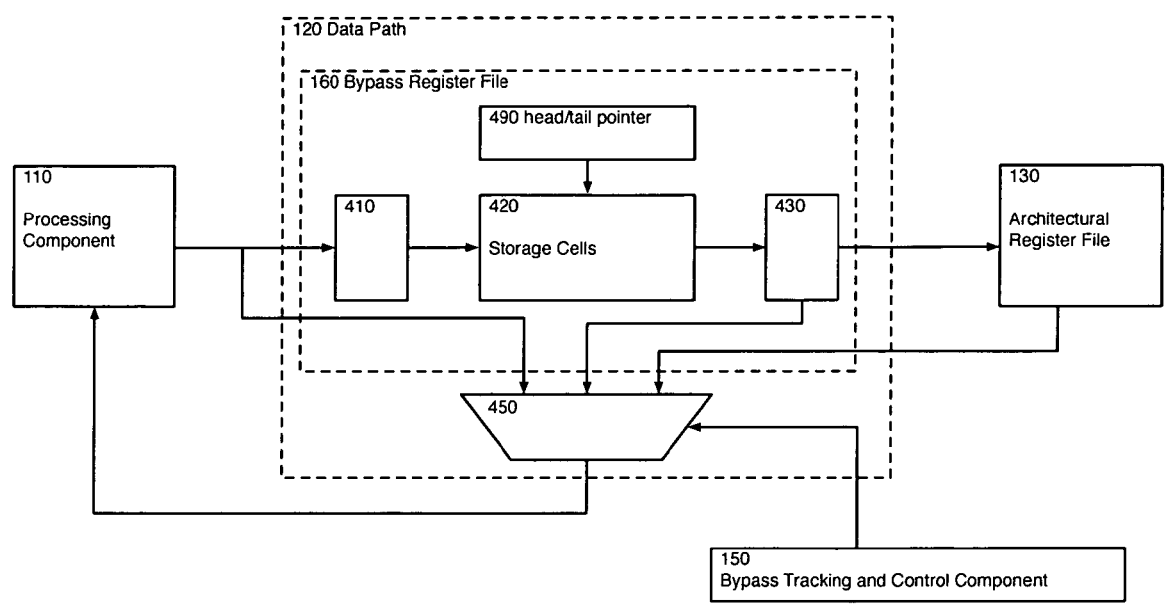
FIG. 2 is a block diagram of an exemplary bypass register file included in a processing pipeline in accordance with one embodiment of the present invention.

FIG. 2 is a block diagram of bypass register file 160 included in processing pipeline 100 in accordance with one embodiment of the present invention. In one embodiment, path 120 includes bypass register file 160 and result selection component 450. Bypass register file 160 includes write ports 410, a plurality of cells 420 and read ports 430. Write ports 410 are coupled to the plurality of cells 420 which in turn are coupled to read ports 430.

In one exemplary implementation, the bypass register file 160 includes one write port and two read ports. One of the read ports is for reading a value to retire to the architectural register file and the other one of the read ports is for reading source operands for the processing component 110. Bypass register file 160 can include additional read ports for reading additional source operands.

In another embodiment, bypass register file 160 includes additional write ports to receive multiple results in a single cycle, for example results produced in different stages of the processing component 110 (e.g., with different "latencies" relative to the beginning of the pipeline).

The components of bypass register file 160 and control component 150 cooperatively operate to implement stages of a processing information pipeline . Write ports 410 receive computation or processing result information. The plurality of cells 420 store the processing information. Read ports 430 forward the processing result information to a architectural register file (e.g., architectural register file 130) and a bypass path. Head and tail pointers 490 control where new result information is written, and from where result information is read for retirement to the architectural register file.

In one embodiment, read ports 430 forward the processing information to a selection component 450 included in the bypass path. Selection component 450 can be included in data path 120. In one exemplary implementation, selection component 450 receives processing result information from processing component 110, bypass register file read port 430 and architectural register file 130. Selection component 450 selectively forwards the received information back to processing component 110 via a bypass feed back path in accordance with directions from bypass tracking and control component 150. Selection component 450 can include a multiplexer for selecting between a portion of the processing information in the architectural register file and a portion of the processing information in the bypass file register.

In one embodiment, processing component 110 produces results with differing latency (e.g., as measured relative to the start of the processing pipeline). For example, processing component 110 might produce "fast" results after one cycle of processing, and "slow" results after three cycles of processing. To handle this, a bypass register file might include multiple copies of the head pointer 490, one for each distinct latency of processing component 110. The multiple head pointers are rotated in unison, but are "offset" from each other corresponding to the difference in latencies in processing component 110. For example, in a given cycle a first head pointer corresponding to a "fast" 1-cycle result might point at entry number i, while a second head pointer corresponding to a "slow" 3-cycle result points at entry number (i+(3−1)). Results of a given latency are written into the bypass register file into the entry indicated by the head pointer associated with that given latency.

FIG. 3 is a flow chart of an exemplary processing bypass method 500 in accordance with one embodiment of the present invention. In one embodiment processing bypass method 500 can produce multiple results per cycle.

At block 510 computation result information is received. In one embodiment, the computation result information is received from a processing component (e.g., processing component 110).

The computation result information is written to a bypass register file at block 520.

Figure 4:
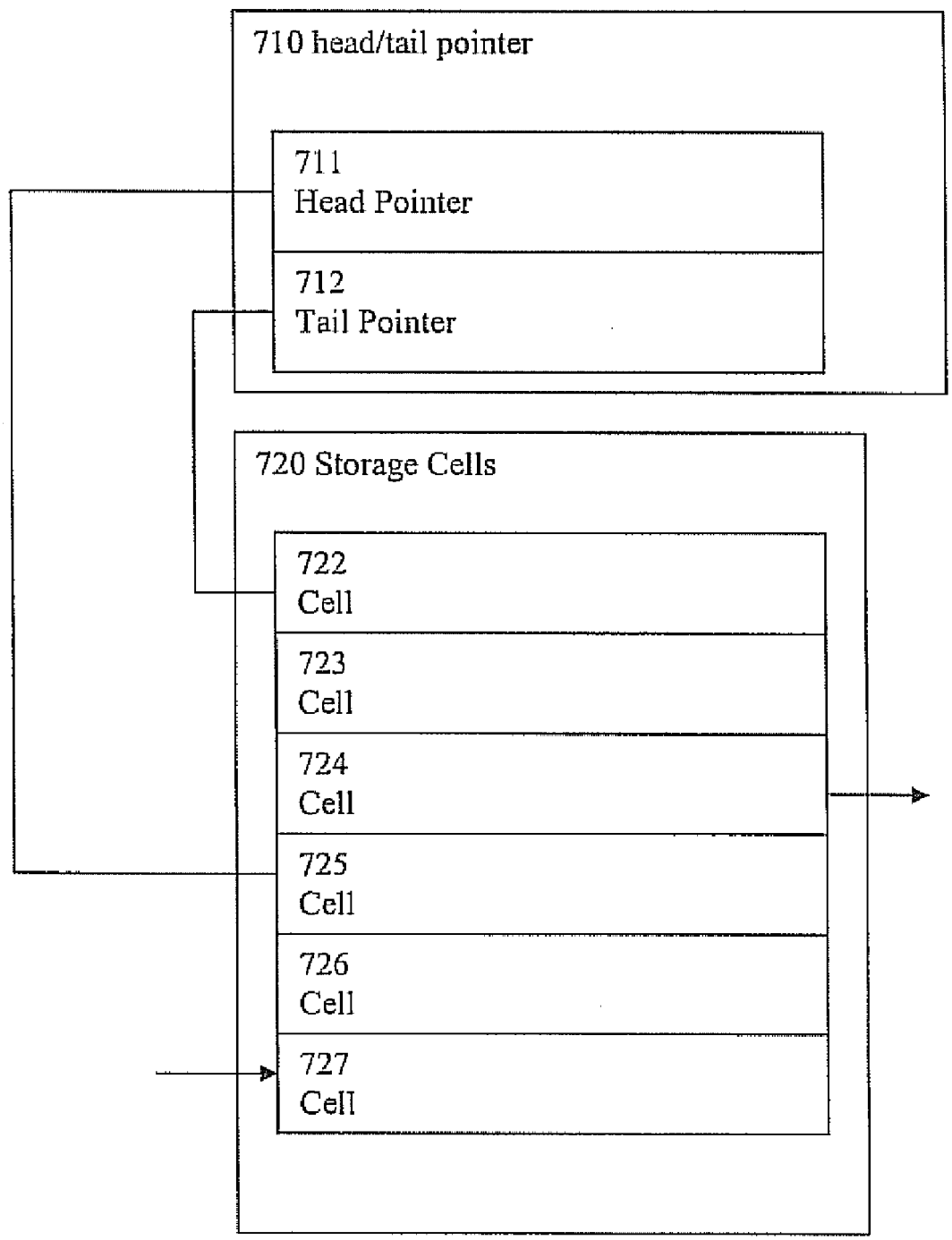
FIG. 4 is a block diagram of an exemplary implementation in which a head/tail pointer and storage cells are utilized in accordance with one embodiment of the present invention.

In block 530 indices are rotated into the bypass register file. In one embodiment, the indices include a head pointer and tail pointer. In one exemplary implementation, new results are written into the bypass register file at a fixed offset relative to where the head pointer points. Computation information to be retired is read from the bypass register file at a fixed offset relative to where the tail pointer points. FIG. 4 is a block diagram of an exemplary implementation in which head/tail pointer 710 (e.g., one embodiment of head/tail pointer 490) and storage cells (e.g., one embodiment of storage cells 420) are utilized in accordance with one embodiment. New results are written into storage cell 727 of a bypass register file at a fixed offset (e.g., cell 726) relative to where (e.g., cell 725) the head pointer 711 points and information to be retired is read from storage cells (e.g., cell 724) of the bypass register file at a fixed offset (e.g., in cell 723) relative to where (e.g. cell 722) the tail pointer 712 points. Head/tail pointer 710 can include a second head pointer 731. In one embodiment, head pointer 711 is associated with a first latency and head pointer 731 is associated with a second latency. In one embodiment, rotating includes incrementing or decrementing a head and tail pointer with warp around. Head and tail pointers move in unison, and so can be implemented via a single physical register.

At block 540 the computation information can be retired to a architectural register file, based on the tail pointer index.

At block 550 the computation information can be retired to a architectural register file, based on the tail pointer index.

In one embodiment, the computation information is staged in optional block 505.

Figure 5:
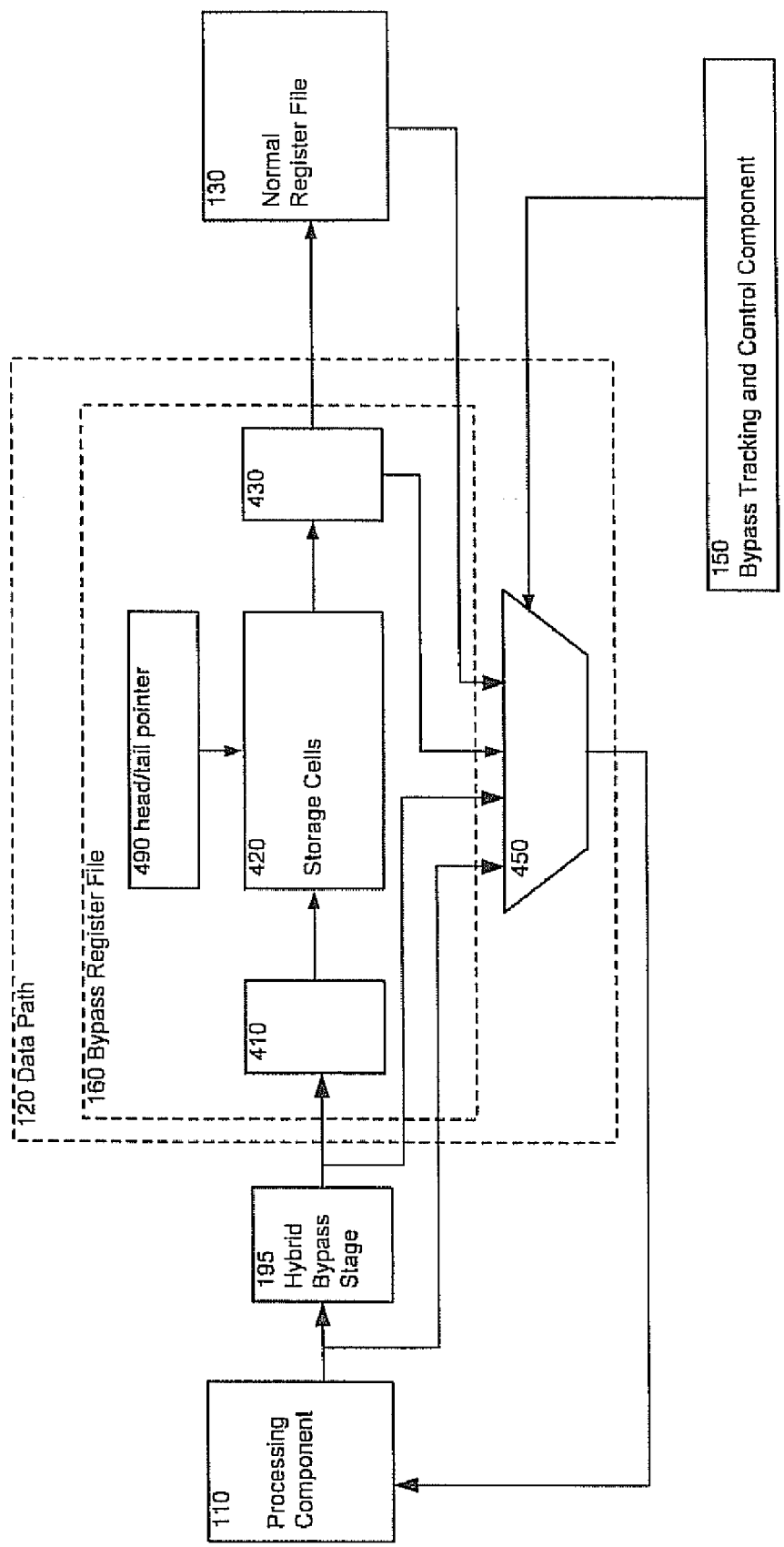
FIG. 5 is a block diagram of another exemplary configuration of a processing pipeline including a hybrid bypass register stage in accordance with one embodiment of the present invention.

In one embodiment there is a delay from writing processing information into a bypass register file to that information becoming available for reading. In one embodiment, a fast register is added to "stage" output from the processing element by one cycle, and a leg is added to selection component 450, allowing it to deliver a critical result from said additional register. The output from the bypass register file can be ignored in this case. FIG. 5 is a block diagram of another exemplary configuration processing pipeline 100 including a hybrid bypass register stage 195 in accordance with one embodiment of the present invention. Hybrid bypass stage 195 stages output from said processing component before writing to said bypass register file. It is appreciated that additional stages of hybrid bypass can be handled if the bypass register file is "farther away" from where new results are produced.

In addition to reducing die area, the present invention systems and methods can facilitate power reduction. For example, bypass register file energy consumption is mainly a function of the macro-architecture (# of source operands) and largely independent of pipeline length, whereas the traditional bypass network energy consumption grows as pipeline length increases.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A processing pipeline system comprising:
   a processing component for processing information and producing processing result information;
   a bypass register file for receiving said processing result information, wherein said bypass register file includes:
   a write port for receiving processing result information;
   a plurality of cells for storing the processing result information;
   a plurality of read ports for forwarding the processing result information to an architectural register file and a bypass feedback path; and
   a head pointer pointing to an entry inside the bypass register file; and
   a hybrid bypass stage for staging output of the processing result information from said processing component before writing to said bypass register file.

2. The processing pipeline system of claim 1 wherein processing result information from the processing component is stored into the entry indicated by the head pointer.

3. The processing pipeline system of claim 1 wherein said processing result information from the entry indicated by the head pointer is read out of the bypass register file.

4. The processing pipeline system of claim 3 wherein each cycle, the head pointer is rotated to point to a different entry in the bypass register file.

5. The processing pipeline system of claim 4 wherein the rotating is implemented by incrementing or decrementing the head pointer modulo N where N is the number of entries in the bypass register file.

6. The processing pipeline system of claim 1 further comprising additional read ports for reading source operands.

7. The processing pipeline system of claim 1 further comprising additional write ports and handling multiple results per cycle.

8. The processing pipeline system of claim 1 further comprising plurality of head pointers.

9. The processing pipeline system of claim 1 wherein each of the plurality of head pointers is associated with a respective one of a plurality of tail pointers.

10. A pipeline method comprising:
    staging computation result information;
    receiving computation result information in a bypass register file;
    rotating a head pointer and a tail pointer into said bypass register file;
    writing said computation result information to said bypass register file in accordance with said head pointer; and
    retiring said computation information based upon said tail pointer.

11. The pipeline method of claim 10 further comprising forwarding said computation information based on bypass tracking and control signals.

12. The pipeline method of claim 10 wherein new results are written into said bypass register file at a fixed offset relative to where said head pointer points.

13. The pipeline method of claim 10 wherein information to be retired is read from said bypass register file at a fixed offset relative to where said tail pointer points.

14. The pipeline method of claim 10 wherein rotating includes incrementing said head pointer and tail pointer with wrap around.

15. Method of claim 10 wherein rotating includes decrementing said head pointer and tail pointer with wrap around.

16. The pipeline method of claim 10 wherein said head and tail pointers move in unison.

17. The pipeline method of claim 10 further comprising delaying processing information becoming available for reading from a time that said processing formation has been written into said bypass register file.

18. The pipeline method of claim 10 further comprising associating a latency with said head pointer.

19. A processing pipeline system comprising:
    a means for staging computation result information;
    a means for storing said computation result information in a storage entry after said staging, wherein said computation result information remains in said storage entry until retired to an architectural register file; and
    a means for tracking a head pointer and a tail pointer that indicates where in said means for storing to store computation result information and where to retire said computation result information from.

* * * * *